June 23, 1959   E. A. NEWMAN ET AL   2,891,723
PROGRAMMED CONTROL MEANS FOR DATA TRANSFER APPARATUS
Filed May 26, 1952   8 Sheets-Sheet 1

United States Patent Office 2,891,723
Patented June 23, 1959

2,891,723
PROGRAMMED CONTROL MEANS FOR DATA TRANSFER APPARATUS

Edward Arthur Newman, Teddington, Donald Watts Davies, Southsea, and David Oswald Clayden, Heston, England, assignors to National Research Development Corporation, London, England Application May 26, 1952, Serial No. 290,014

Claims priority, application Great Britain June 2, 1951

9 Claims. (Cl. 235—152)

This invention relates to electrical digital computing engines working in the serial mode and is applicable to such engines in which words (numbers or instructions) are stored in devices which are arranged to deliver serial pulse signals representing the numbers and instructions.

A convenient form of such a storage device is the well-known acoustic delay line which consists essentially of a straight cylindrical tube filled with mercury and with a piezo-electric crystal at each end. If an electrical pulse is applied to the crystal at one end of the line an ultrasonic wave travels down the line at the velocity of sound in mercury and at the other end is converted into an electrical pulse by the other crystal. This new pulse may be exemplified, reshaped and fed back to the input crystal and in this way the pulse or a whole pattern of pulses may be preserved indefinitely.

Another example of such a storage device is the magnetic recording store in which parts of a moving ferromagnetic member are magnetised to record digits representing numbers in the binary scale of notation. Magnetic stores of this kind are described, for example, in the specifications of copending United States patent applications Ser. No. 146,446 by Frederic C. Williams, filed February 27, 1950; Ser. No. 146,445 by Frederic C. Williams and John C. West, filed February 27, 1950, now Patent No. 2,652,554, granted September 15, 1953; Serial No. 195,042 by Frederic C. Williams, Tom Kilburn and Gordon E. Thomas, filed November 10, 1950, now Patent No. 2,700,588, granted January 25, 1955; and Ser. No. 196,776 by James Dean and Brian W. Pollard, filed November 21, 1950, now Patent No. 2,694,192, granted November 9, 1954.

In digital computing engines of this sort calculations are made by transferring words from one part of the machine to another. For example, to add a number A to a number B, the number A may be transferred from its original store to a store called an accumulator, the number B being transferred to the accumulator where it is added to the number A and the result $A+B$ being transferred to a suitable store position. The paths along which words are transferred are known as highways or buses. A store may, and usually does, contain more than one word (for example, the stores may each contain 32 words), the words emerging in turn one after the other. The time taken by a word in emerging is called a minor cycle, and the time taken by all the words of a store in emerging (that is, in this case, 32 minor cycles) is called a major cycle. The first digit time in a minor cycle is called P1, the second digit time being called P2, and so on, the $n$th digit time being called P$n$. A pulse occurring in the $n$th digit time but delayed by a half digit time is called a P$n\frac{1}{2}$ pulse. In certain circumstances more than one word may be required to be transferred, but usually only one word is transferred, so that the transfer takes exactly one minor cycle. Thus transfers have to be carefully timed in order to transfer the right word or words. The present invention is concerned with methods of transferring words from one part of a computing engine to another part and to apparatus for effecting such methods. The invention is particularly concerned with the timing of such transfers.

The nature of the present invention may be better appreciated if it is considered in the light of what has been done hitherto.

It has previously been proposed to organise a serial mode computing engine so that an instruction word ordering a transfer will also contain digits which indicate the source of the next instruction and to take this next instruction from that source after the transfer has finished.

It was realised that in a machine of this kind it was necessary to have a subsidiary short delay line or like store to receive the next instruction and to let this instruction flow into the control system to effect the next transfer. The instruction word will contain at least one timing number and this will have to be counted, that is to say the number will circulate in another subsidiary short delay line having one added (or subtracted) in each circulation until a digit occurs in a certain position to initiate or end the transfer.

An engine of this kind was made and is described in chapter 8 of "Calculating Instruments and Machines" by D. R. Hartee, published by The University of Illinois Press, 1949, and Cambridge University Press, 1950.

It was not previously considered possible to employ less than two subsidiary delay lines for the purposes described above but the present invention makes this possible.

The terms used in this specification and the symbols used in the accompanying drawings are well-known to those skilled in this art and are defined and explained in the specification of co-pending United States patent application Ser. No. 202,615, by James H. Wilkinson, filed December 26, 1950, now Patent No. 2,686,632, granted August 17, 1954.

According to the present invention there is provided an electrical digital computing engine arranged to work in the serial mode and having in its control system a short delay line or like store having a circulation path and adapted to store one word, means for gating during the last minor cycle of a transfer the next instruction word to be obeyed into the short delay line, a counting circuit connected in the circulation path of the short delay line and arranged to count at least one time-defining number in the instruction word and so to give an output at a time determined by the time-defining number, a trigger controlled at least mediately by this output and arranged to condition gates to permit the transfers of words from one part of the engine to another when this trigger is on.

An instruction word flows into the short line during the last minor cycle of a transfer and during the next minor cycle (called the set-up minor cycle) it flows out to set up, by means of the usual staticisors, the routes for the next transfer. Counting of the time-defining number starts in the set-up minor cycle and the instruction word circulates in the short line until the beginning of the last minor cycle of the transfer. At this stage a gate in the circulation of the short line is closed and the current instruction word flows out of the line and is obliterated at the closed gate, and at the same time a gate between the short line and an instruction highway is opened and the instruction word for the next following transfer flows into the line.

Each instruction word routes the source of the next instruction word to the instruction highway and the instruction words are arranged in the instruction stores so that each instruction word occupies the last minor cycle of the transfer ordered by the previous instruction word.

This is a very simple matter. Probably the easiest method is to arrange a chart having a number of columns equal to the number of instruction sources, each column having a number of entry spaces equal to the number of words that can be stored in one store (in this case 32). When the first instruction has been entered it will be known when the last minor cycle of the corresponding transfer will occur and the second instruction will be written in that minor cycle on the chart. This process is repeated and when the required space is already filled in one column the instruction word is written in the empty corresponding space in one of the other columns, the "next instruction" address being chosen to select the store represented by the chosen column.

As is usual in these engines, the next instruction to be obeyed may depend on the result of an arithmetical or logical operation performed in the current transfer and in these cases a signal may be transmitted to a discriminating circuit which will select one of two consecutive instructions.

The invention will now be described, by way of example, with reference to the accompanying drawings of which—

The invention will be described, by way of example, with reference to a computing engine employing words of 32 digits and 32 words or minor cycles to the major cycle. It will be assumed that the inter-digit time is one microsecond.

In electronic computing engines computations are performed by transferring stored numbers from one destination to another. For example, to add a number A to a number B, the number A may be transferred to an accumulator, the number B is then transferred to the accumulator where it is added to A and the result $A+B$ is transferred to a suitable store position. In engines of the type to which the present invention relates, stored words are circulated in devices which deliver words serially, for example, acoustic delay lines. In order to effect a useful transfer, therefore, it is necessary to determine the source of the number to be transferred, the destination of the number and the times at which the transfer is to begin and end. In addition, the source of the next instruction to be obeyed, may be indicated in the current instruction, and the kind of transfer may also be determined by one or more digits which are usually called characteristic digits.

Figure 1:
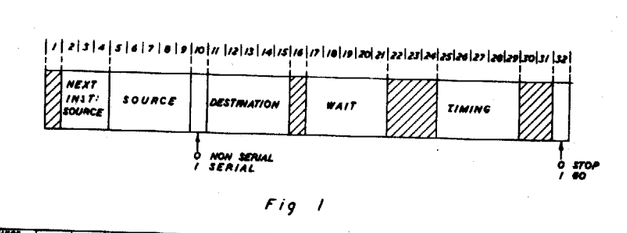
Figure 1 shows the scheme of an instruction word in one embodiment of the invention.

In the embodiment of the invention to be particularly described, the instruction words comprise 32 digits arranged as shown diagrammatically in Figure 1. The next instruction may come from any one of eight possible sources defined by three digits in positions 2, 3 and 4. The number to be transferred may come from one of 32 sources defined by five digits in positions 5 to 9. Similarly the destination is defined by five digits in the places 11 to 15. The transfer may be required to begin and end in any of the 32 minor cycles in a major cycle, and the time of transfer is defined by two time-defining numbers which for convenience will be hereinafter referred to as the "waiting number" and the "timing number." The waiting number (hereinafter designated by W) is defined by digits in places 17 to 21, and the timing number (hereinafter designated by T) is defined by digits in places 25 to 29. A digit in place 10 determines whether a transfer is serial or non-serial. The meaning of this will be explained hereinafter. A zero digit in place 32 may be used for stopping the machine when a certain step of the computation has been reached.

To effect a transfer at a given minor cycle defined by waiting or timing numbers, it is necessary for the engine to count these numbers and according to one embodiment of the present invention counting is effected by subtracting 1 from a number during each minor cycle until the number goes negative. Subtraction of 1 from a number in binary arithmetic may be done by complementing the least significant digits of the number up to and including the least significant one in the number and then taking the number as it stands. This will become clear when an example is considered, thus:

Number 0 0 0 0 1 | 0 1 0 1 1
Subtract 1

Result 1 1 1 1 0 | 0 1 0 1 1

In this example the least significant digits are on the left.

The timing and waiting numbers T and W are used as follows:

A non-serial transfer commences $W+1$ minor cycles after it has been set up, goes on $T-W+1$ minor cycles and the next instruction to be obeyed occurs in the machine storage in the last minor cycle of the transfer and is set up in the following minor cycle. In the case of a serial instruction, the waiting period is the same, the transfer lasts only one minor cycle and the next instruction occurs in what would have been the last minor cycle of the transfer if it had been a non-serial transfer.

Figure 2:
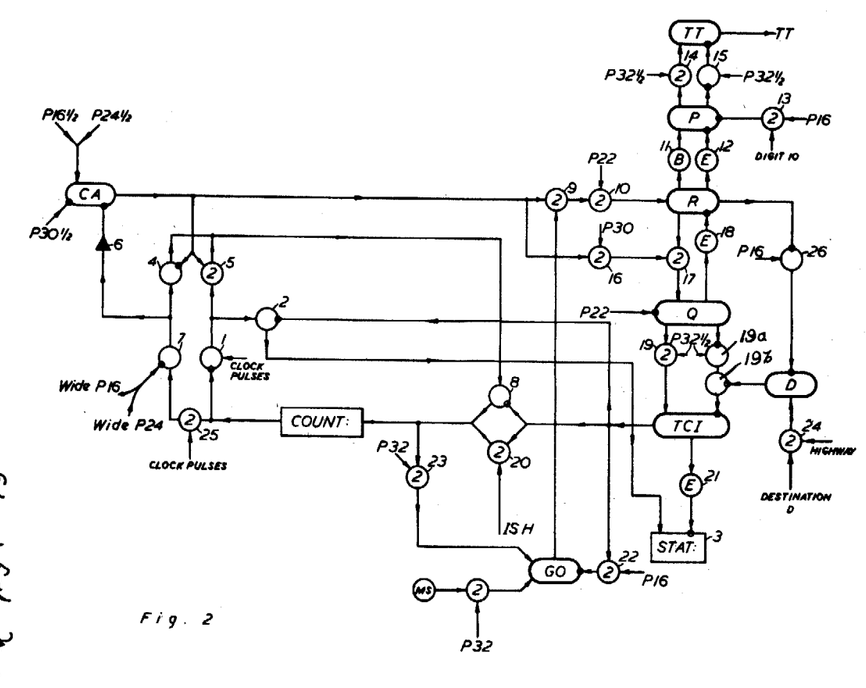
Figure 2 shows a circuit diagram of an embodiment of the invention to be used with an instruction word of the kind shown in Figure 1.

The circuit arrangement in one embodiment of the invention is shown in Figure 2. In this embodiment, the output from the trigger TT is used for timing the actual periods of transfer, for example, in the manner described in co-pending United States patent applications Ser. No. 222,365 by Donald W. Davies and Michael Woodger, filed April 23, 1951, now abandoned, and Ser. No. 222,366 by Alan M. Turing, Donald W. Davies and Michael Woodger, filed April 23, 1951, now Patent No. 2,799,449; that is to say, it controls and gates arranged in a highway or bus between the source and the destination specified in the transfer so that the transfer is permitted only during the period in which the trigger TT is on.

Let us suppose that an instruction to be obeyed occurs in the machine storage in minor cycle $m-1$ and is set up in minor cycle $m$. In the counting device the waiting and timing numbers W and T are diminished by one in each minor cycle, hence their values may be indicated by the following:

| Minor Cycle. | Number going to subtractor in waiting number position | Number going to subtractor in timing number position |
|---|---|---|
| $m$ (set-up) | W | T |
| $m+1$<br>$m+2$ | $W-1$<br>$W-2$ | $T-1$<br>$T-2$ |
| $m+W$<br>$m+W+1$ | 0<br>$-1\equiv 31$ | $T-W$<br>$T-W-1$ |
| $m+T$<br>$m+T+1$ | $32+W-T$<br>$31+W-T$ | 0<br>$-1\equiv 31$ |

The important minor cycles are minor cycle $m+W$ and minor cycle $m+T$ because in these minor cycles, the numbers in the waiting and timing numbers positions respectively are zero for the first time and allow digits to appear in places 22 and 30 respectively. These digits are gated out and are used to set triggers which prepare the putting on or off of certain timing triggers. This will become clear when Figure 2 is considered in conjunction with Figure 3. It will be assumed that at the beginning of minor cycle $m$, the instruction to be obeyed is contained in the short tank Count in Figure 2 (having flowed in during minor cycle $m-1$) and that all the triggers except the trigger GO are off. That this state of affairs is obtained will become clear when the explanation of the circuit is complete.

In the minor cycle $m$ (the set-up minor cycle) the digits defining the next instruction source, the transfer number source, the kind of transfer (serial or non-serial) and the destination will flow, via the gates 1 and 2 to the staticisor 3 where they set up the route of the transfer. In the same minor cycle, the waiting and timing numbers will circulate back to the tank Count, via the gate 4 or 5 (according to the state of the trigger CA) and the gate 8.

Consider first the effect of this circulation on the waiting number. During the first digit or digits of W, the trigger CA, having been put on at P16½, will remain on up to and including the first one digit in W which will then put CA off through the half unit delay 6. While CA is on, W will recirculate to Count through the gate 5, having been complemented at the gate 1. As arranged the gate 1 may be called a complementing gate. As soon as CA goes off the remaining part of W will circulate un-complemented via the gates 7 and 4. The net result of this is that the number in the waiting number position is reduced by one in each circulation. It will be appreciated that the circulation is not stopped at the gate 8 because the trigger TCI is off. The timing number T suffers a similar reduction by one in each minor cycle, because CA is put on again at P24½. In all cases CA is also put off at P30½.

Ultimately (in minor cycle $m+W$) the waiting number flowing to the trigger CA will become zero and will not put this trigger off. This means that for the first time CA will be on in the P22 period and its output, gated by the trigger GO at the gate 9, will allow a P22 pulse through the gate 10 to put on the trigger R, thus in Figure 3 it will be seen that the trigger R goes on at P22 time in minor cycle $m+W$. Immediately R goes on it puts on the trigger P through the beginning element 11.

Later in the process (in minor cycle $m+T$) the timing number will become zero and will not put the trigger CA off. This trigger will then be on for the first time in the P30 period and will gate a P30 pulse through the gate 16 which will pass through the gate 17 (because R is on) and put the trigger Q on at P30 time in minor cycle $m+T$. This trigger Q is then put off at P22 in the next minor cycle. When it goes off, it puts the trigger R off through the end element 18. The state of the trigger Q is indicated in Figure 3.

If the digit in the position 10 is a zero (a non-serial transfer) the trigger P remains on until R goes off when it puts P off through the end element 12. If the digit in place 10 is a one (a serial transfer) P is put off by a P16 pulse via the gate 13 in the next minor cycle after it has gone on. The state of the trigger P is indicated in Figure 3 in a full line for a non-serial transfer and in a dotted line for a serial transfer.

Figure 3:
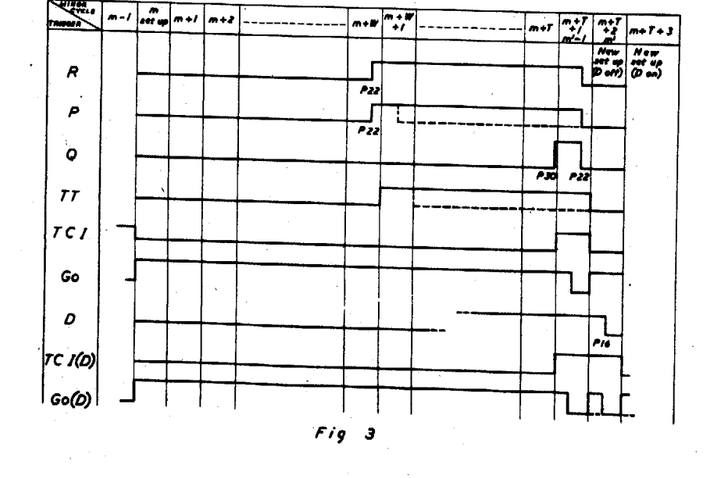
Figure 3 is a timing diagram showing the states of triggers in the circuit shown in Figure 2 in carrying out a given instruction.

It will be seen that the trigger P prepares the way for the putting on and off of the trigger TT by P32½ pulses via the gates 14 and 15, thus the state of TT is indicated in Figure 3 in a full line for a non-serial transfer and in a dotted line for a serial transfer.

At this stage it can be seen that the desired timing of the transfer is obtained, that is to say, an instruction set up in minor cycle $m$, produces a transfer starting at P32½ time in minor cycle $m+W$ and lasting 1 minor cycle in the case of a serial transfer, or $T-W+1$ minor cycle in the case of a non-serial transfer.

It will be assumed for the time being that the trigger D has not been put on. In this case the trigger TC1 will be put on by a P32½ pulse via the gate 19 in minor cycle $m+T$ and will be put off by a P32½ pulse via the gates 19a and 19b in the next minor cycle $m+T+1$ because by this time the trigger Q will be off again. The state of trigger TCI is also indicated in Figure 3.

It will be seen that minor cycle $m+T+1$ (during which TCI is on) is the last minor cycle of a serial transfer or what would have been the last minor cycle if the transfer had been a serial transfer and it is the instruction coming from the instruction highway or bus ISH during this minor cycle that is the next instruction to be obeyed. This minor cycle corresponds to the minor cycle $m-1$ for the instruction we have been considering previously, and may be denoted by $m'-1$, where $m'$ is the next set up minor cycle. During this minor cycle $m'-1$ the previous instruction, no longer being required, will be destroyed at the gate 8, because TCI is on and the next instruction to be obeyed will flow from the instruction highway ISH through the gate 20 into the short tank Count and the process described above will be carried out in accordance with the new instruction word.

When TCI goes off at the end of minor cycle $m'-1$, it clears the staticiser 3 through the end element 21 to enable the new instruction digits to be staticised. During minor cycle $m'-1$ TCI will gate a P16 pulse through the gate 22 to put the trigger GO off. However if the engine is to continue working, the new instruction will contain a 1 digit in place 32, and this will gate a P32 pulse through the gate 23 to put the trigger GO on at the end of minor cycle $m'-1$. If the machine has to stop there will be a zero in place 32 and GO will not be put on but, in the meanwhile, the next instruction to be obeyed will be re-circulating through Count and the numbers W and T will be continuously recounted. The number W will not be allowed to run into the number T because digits occuring in place 24 will be pecked out by a wide P24 pulse at the gate 7. A wide P16 pulse may also be applied at this gate to peck out any P16 pulse that may have got into this place. The number T will not be allowed to extend into the stop-go place 32 because the trigger CA is continuously put off at P30½. When it is required to start the machine again, the trigger GO may be put on at P32 time by a manual one-shot device M.S.

It will be seen now that the state of the triggers at the beginning of a set-up minor cycle, is as assumed above.

The effect of the trigger D may now be considered. This is the discriminating trigger normally used in these engines. It may be put on by any word having at least one digit pulse applied via the gate 24. As is usual in these machines, the effect of D is to delay the setting up of the next instruction by one minor cycle and thus, if during a transfer the trigger D has been put on, as indicated in Figure 3, it will remain on until P16 time in the minor cycle following the one in which the trigger R goes off because a P16 pulse then passes through the gate 26. The effect of D being on, therefore, is to keep TCI on for one minor cycle longer, as indicated in Figure 3 at TCI(D). Consequently the next instruction to be obeyed is selected one minor cycle later and the course of the computation can be modified in known manner. Thus if an instruction occurs in minor cycle $p$ the next instruction to be obeyed will normally occur in minor cycle $p+T+2$ but in minor cycle $p+T+3$ if the trigger D has been put on.

The state of the trigger GO when the trigger D has been put on is also indicated in Fig. 3 at GO(D). The full line indicates the case when the instruction in minor cycle $m+T+1$ has a one in place 32 and the dotted line the case when the instruction in this minor cycle has a zero in place 32. In any case the trigger GO is off between P16 and P32 time when a spurious P22 may occur at the gate 10.

The pulses coming out of the short tank Count will be wide pulses and are re-shaped by clock pulses either at the gate 1, where they are negated, or at the and gate 25.

In the foregoing description it has been tacitly assumed that T is not less than W. If however T is less than W then T is effectively increased by 32 so as to come effectively greater than W. This is done by the gate 17, because the first P30 coming from the gate 16 will occur before the first P22 coming from the gate 10 has put the trigger R on, hence the gate 17 stops the first P30. However a major cycle (i.e. 32 minor cycles) later the P30 will re-appear at the gate 16 and by this time a P22 will have been gated through the gate 10 to put the trigger R on so that the second P30 at the gate 16 passes through and puts the trigger Q on.

The invention has been described, by way of example, with reference to an engine using instruction words having two time-defining numbers. However engines have been designed in which transfers are ordered by instruction words having only one time-defining number in combination with a multidigit characteristic. One such engine which uses separate short delay lines for receiving the instruction word and counting the timing number, is described in United States patent application Ser. No. 222,366 by Alan M. Turing, Donald W. Davies and Michael Woodger, filed April 23, 1951, now Patent No. 2,799,449. The present invention may readily be applied to such engines. It is understood that the counting circut in the circulation of the tank Count consists of the gates 25, 7 and 1, the delay 6, the trigger CA, the gates 4 and 5 and the gates 10 and 16. The gate 8, although in the circulation path, plays no essential part in the counting process. Similarly the gate 9 is not concerned with the actual counting process but is used to stop pulses resulting from the counting process, becoming effective unless certain conditions have been fulfilled.

In the particular embodiment described the counter subtracted one from the waiting and timing numbers in each circulation of the instruction word until the carry trigger CA was on in the digit periods (P22 and P30) immediately following the waiting and timing numbers. Obviously the waiting and timing numbers may be inserted in the instruction word in a form in which they can be counted by adding one in each circulation and this may conveniently be done by negating the number to be counted up to and including the first zero.

Details of the elements shown in the circuit diagram of Figure 2 will now be described with reference to Figures 4 to 9 of the accompanying drawings. In these circuits the parts corresponding to the circuit in Figure 2 are similarly numbered. These circuits comprise double-triode gates (indicated by numbers). These gates conduct on the side of the gate which has its grid voltage at least a grid base higher than the grid voltage of the other side. The normal state of conduction is indicated in the drawings by an arrow. This state changes while and only while a control pulse is incident at the gate. These circuits also comprise triggers (indicated by letters). In the triggers the normal state of conduction is also shown by arrows but this state is changed by an applied control pulse and remains changed after the pulse has finished. The state is then changed back to normal by a resetting pulse. Those skilled in the art will have no difficulty in following the operation of these circuits. The operation of the gate 2 (in Fig. 7) is different from the well-known method of operation of these circuits, but is fully described below. In Figures 4 to 9 leads connecting one figure to another are correspondingly marked with Greek letters.

The chassis of the delay line Count will contain the usual amplifying input, output and reshaping circuits such as are well known to those skilled in this art. It will be convenient to consider first the reshaped normal and negated outputs from the gates 25 and 1 respectively.

Figure 4:
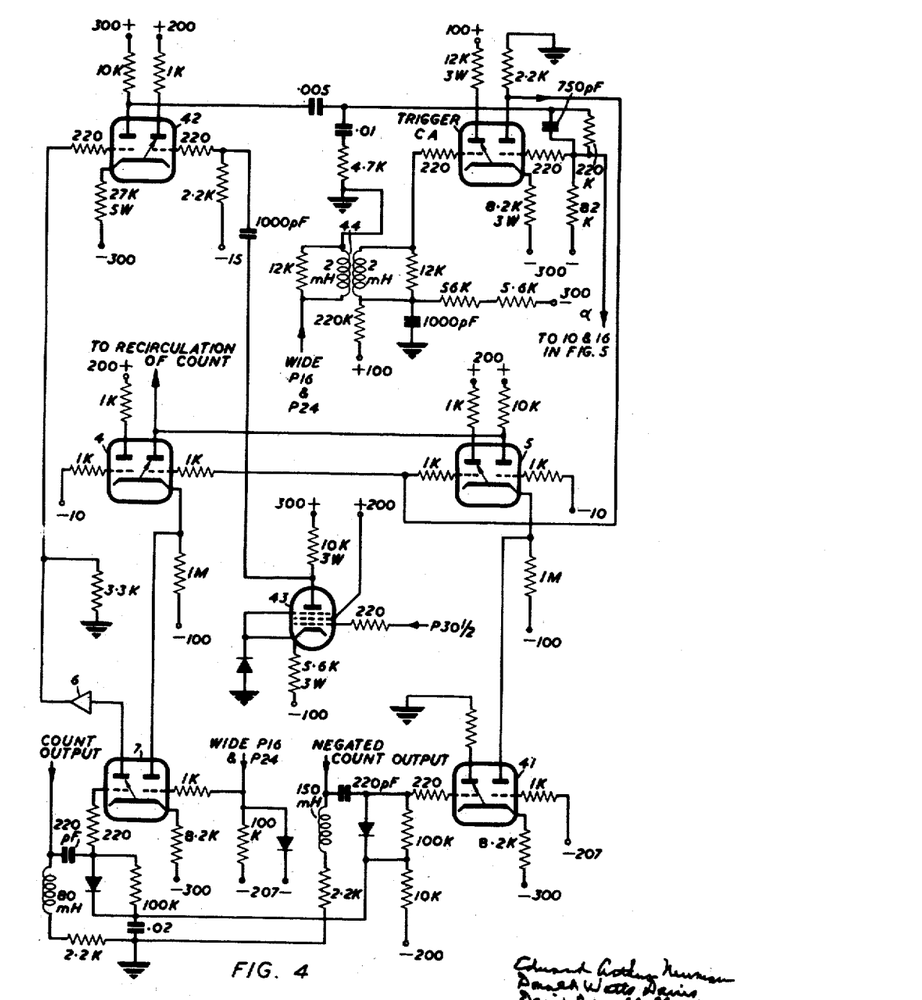
Figures 4 to 9 illustrate details of elements shown in Figure 2.

These are applied respectively to the gate 7 and the gate 41 shown in Figure 4. The gate 41 changes the potential negated output from Count to current pulses in the gate 5. The gate 7 is conditioned by wide P16 and P24 pulses and normally passes its output to the delay line 6 and thence to a gate 42. This gate 42 is also conditioned by a P30½ pulse applied via the valve 43. The gate 42 thus gathers the inputs which put the trigger CA off. The trigger CA is put on at P16½ and P24½ time as follows: Wide P16 and P24 pulses are applied to the transformer 44 which acts as an end element and generates negative pulses at the end of the wide P16 and P24 pulse and so puts the trigger CA on at P16½ and P24½ time.

The output from the trigger CA switches the gates 4 and 5 and their combined outputs return to the recirculation circuit in the Count chassis. Another output from the trigger CA goes to condition gates 10 and 16 shown in Figure 5.

Figure 5:
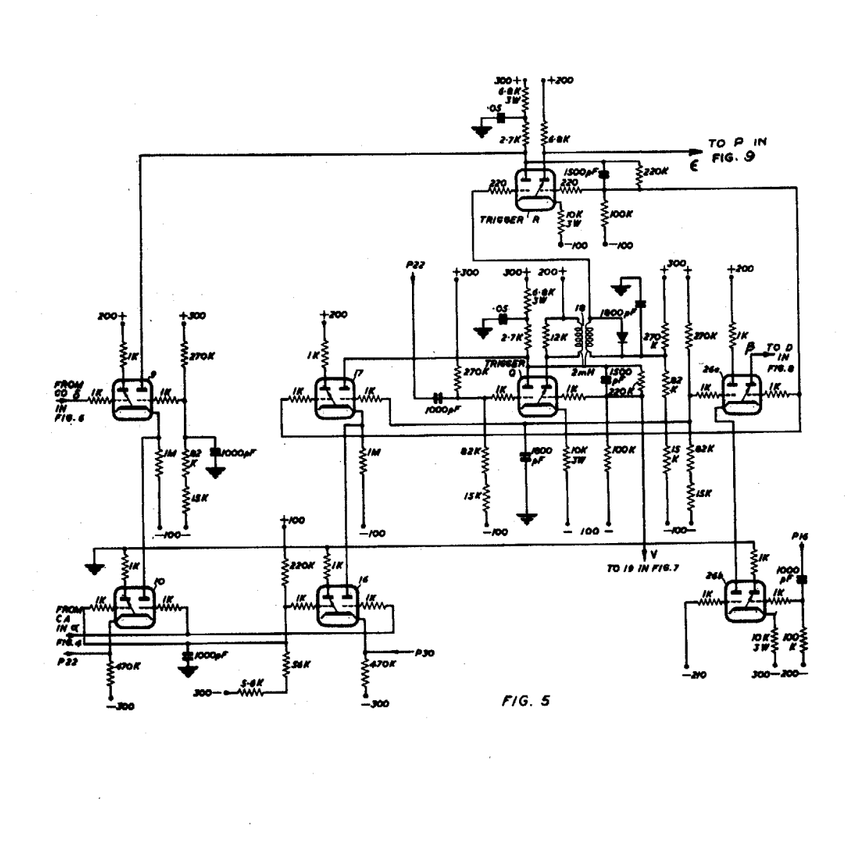

Figure 5 contains the triggers R and Q and the associated elements. The output from the trigger CA stimulates the gate 16 and lets through a P30 pulse which in turn passes through the gate 17 and sets the trigger Q when the trigger R is on. (It will be seen that the trigger R conditions the gate 17 on its left-hand grid.)

The trigger R also conditions a gate 26a which is also conditioned by another gate 26b which is itself conditioned by an applied P16 pulse. The gates 26a and 26b together are equivalent to the gate 26 shown in Figure 2 and the output from the gate 26a goes to put the discriminating trigger D (shown in Figure 8) off.

The trigger Q is put off by a P22 pulse applied to its left-hand grid. When the trigger Q goes off a negative pulse from the transformer 18 (which corresponds with the end element 18 in Figure 2) puts the trigger R off.

The trigger R is put on as follows:
When the trigger CA is on the gate 10 is conditioned to pass a P22 current pulse to the gate 9 and if this gate 9 is conditioned on its left-hand grid by the trigger GO (shown in Figure 6) it will pass the P22 pulse to put the trigger R on by dropping its left-hand anode potential. Compared with Figure 2 the gates 9 and 10 are connected in reverse order in Figure 5 but this is immaterial.

Figure 7:
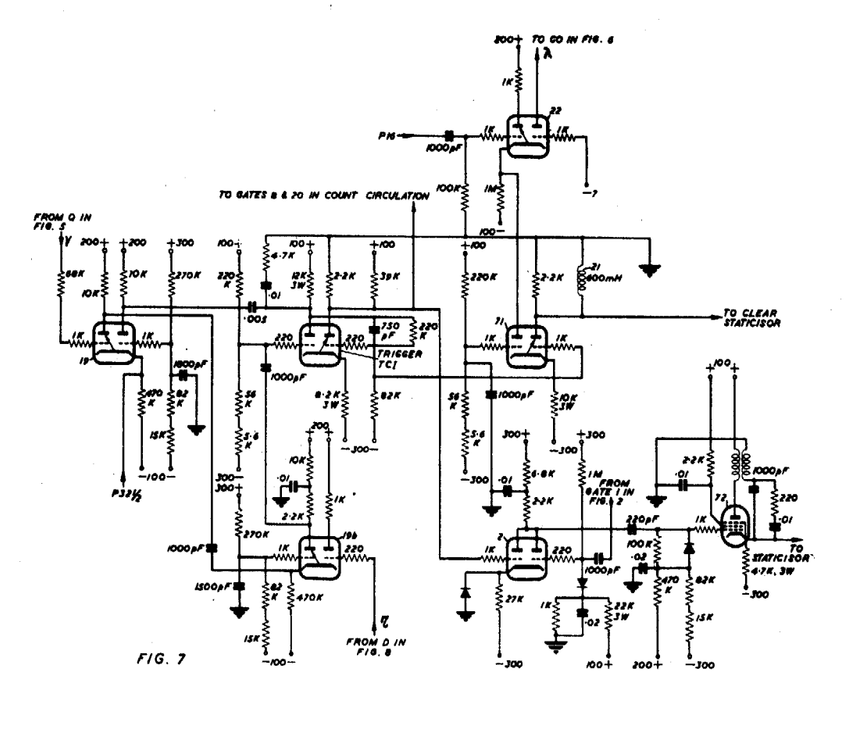

An output from the trigger Q also goes to the gate 19 in Figure 7.

Figure 6:
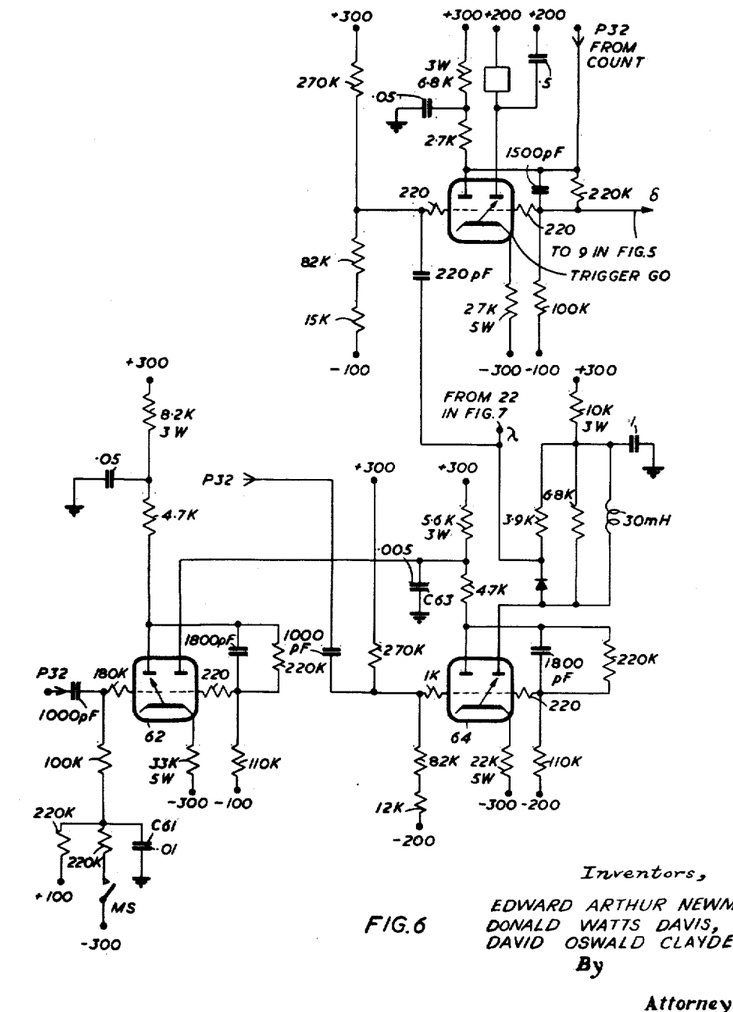

The trigger GO, which conditions the gate 9, is shown in Figure 6.

This trigger can be put on in two ways; firstly by a P32 gated out of the Count circulation by a pulse in the P32 position in the instruction word and secondly by a manual control. This manual control comprises a switch MS which connects, when operated, −300 volts to the condenser C61 through a resistance network. This condenser discharges with a suitable time constant and causes the left-hand grid of the trigger 62 to fall in potential. Superimposed on the potential fall due to the discharging of the condenser 61 there is an applied P32 which sets the trigger 62 at P32 time. This in turn causes a further condenser C63 to discharge with a time constant such that the next following P32 which is applied to the left-hand grid of a further trigger 64 puts this trigger 64 on at P32 time.

When the trigger 64 goes on it puts the trigger GO on by a positive pulse applied to the left-hand grid of GO. The inductive load in the right-hand anode circuit of the trigger 64 constitutes in effect a beginning element.

The trigger GO is put off by a negative pulse coming from the gate 22 shown in Figure 7. In the right-hand anode circuit of the trigger GO there is connected a relay R/1. This may be arranged to light a lamp to give a signal when the trigger remains off and the operation of the computing engine is stopped.

The trigger TCI is shown in Figure 7. It is put on by a P32½ pulse applied via the right-hand anode of the gate 19 when the trigger Q is on. If the trigger Q is off the P32½ pulse will travel via the left-hand anode of the gate 19 to the gate 19b and will put the trigger TCI off.

This assumes that the trigger D (Figure 8) has not been set. If the trigger D has been set the gate 19b will be conducting on its right-hand anode and the P32 pulse will not pass to put the trigger TCI off.

It will be appreciated that the gate 19 in Figure 7 is equivalent to the two gates 19 and 19a in Figure 2.

The output from the trigger TCI goes to the gates 8 and 20 (Figure 2) in the chassis of the delay line Count. An output from the trigger TCI is also fed to a gate 71 so that when the trigger TCI goes off it causes the right-hand anode of the gate 71 to conduct. This causes a negative pulse on the right-hand anode which is passed to the staticisor to clear it.

The inductance 21 in the gate 71 is in effect the end element 21 in Figure 2. When the trigger TCI is on gate 71 conducts on its left-hand anode and at P16 time a pulse passes from the right-hand anode of the gate 22 to put the trigger GO (Figure 6) off.

An output from the trigger TCI also goes to the left-hand grid of the gate 2. The right-hand grid of this gate 2 is fed with the negated output from Count via the gate 1. The gate 2 comprises a double triode having a common anode circuit and the biases are such that the left-hand grid is negative relative to the cathode when the trigger TCI is off and there is no input from the gate 1. The input from the gate 1 is in the form of negative pulses and these give positive pulses at the common anodes as long as the trigger TCI remains off. When the trigger TCI goes on the left-hand grid of the gate 2 goes positive and an input to the right-hand grid has no effect at the common anodes. Thus the trigger TCI inhibits the gate when it goes on. The output from the gate 2 passes to a buffer valve 72 and then on to the staticisor of the engine.

Figure 8:
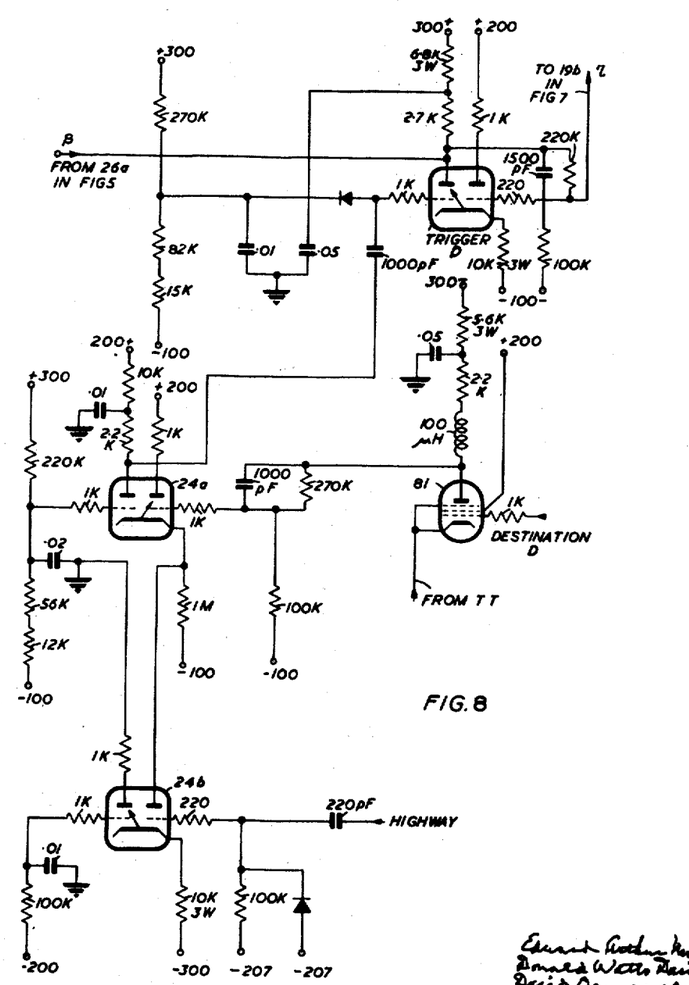

The circuit associated with the discriminating trigger D is shown in Figure 8. It will be remembered that the trigger D is put off by the output from the gate 26a in Figure 5. This output is applied to the left-hand anode of the trigger D. The trigger D is put on by a pulse on its left-hand grid from the gate 24a. This gate 24a is switched by a pulse at Destination D via the valve 81, if now a pulse arrives from Highway on the gate 24b this gate 24b will be switched and the gate 24a, being conditioned by Destination D, will pass a negative pulse to put the trigger D on.

Figure 9:
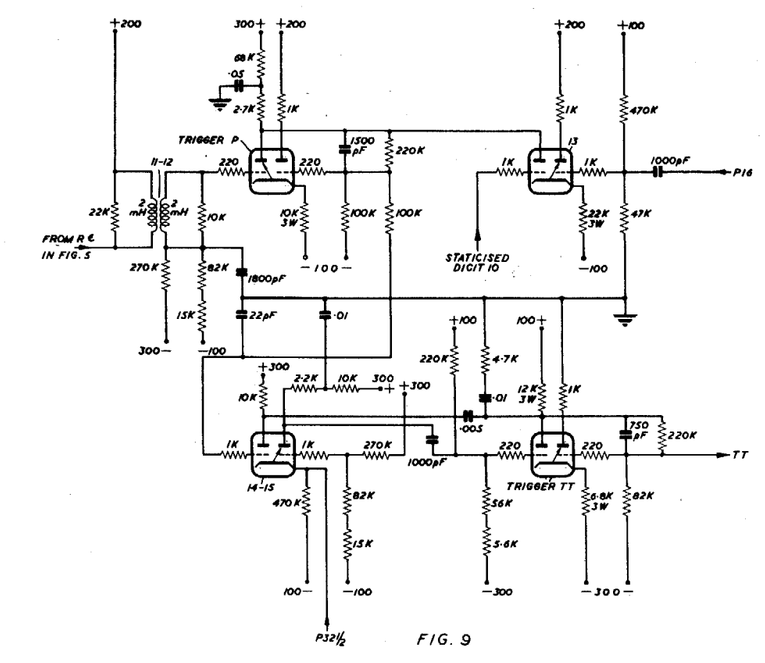

The triggers P and TT are shown in Figure 9. The output from R (Figure 5) is applied to the transformer 11—12 which acts as a beginning element and an end element to put the trigger P on and off. The gate 13 is fed with a P16 pulse (negative going) on its right-hand grid and the staticised digit 10 on its left-hand grid. Thus the left-hand grid potential may be, say, about zero or —50 volts according as digit 10 is a one or a zero. When digit 10 is a one, the P16 pulse can switch the gate 13 and hence put the trigger P off but when digit 10 is a zero the P16 pulse does not go sufficiently low to transfer current to the left-hand anode of the gate 13 and the trigger P is not put off.

The trigger P conditions the gate 14—15 which passes the applied P32½ pulse to put the trigger TT on or off according as the trigger P is on or off.

The output of the trigger TT controls the transfer in well-known manner.

What we claim is:

1. Apparatus for timing the transfer of stored word signals from one part to another of an electrical digital computing engine constructed to work in the serial mode, the said apparatus comprising a short serial store for storing one word signal, gating means for gating an instruction word signal from the instruction store of the said engine into the said short serial store, the said instruction word signal containing at least a first number signal indicating the time at which a transfer is to be carried out and a second number signal indicating the particular transfer to be carried out, a circulation circuit connecting the output end of the said short serial store back to its input end, a counting circuit connected in the said circulation circuit the said counting circuit being connected to register a count on each circulation of the instruction word and to emit an output pulse when the number of counts registered is equal to a number determined by the time at which the transfer is to be carried out, the time being indicated by the said first number signal, a transfer timing trigger connected to be controlled by the said output pulse to yield an output for conditioning gates in the transfer path of the said engine to effect the required transfer and an instruction timing trigger also connected to be controlled by the said output pulse and to control in its turn the said gating means so that the next instruction word signal to be obeyed is gated into the said short serial store during the last minor cycle of the transfer.

2. Apparatus for timing the transfer of stored word signals from one part to another of an electrical digital computing engine constructed to work in the serial mode, the said apparatus comprising a short serial store for storing one word signal, a first gating means for gating an instruction word signal from the main store of the said engine into the said short serial store, the said instruction word signal containing at least a first number signal indicating the time at which a transfer is to be carried out and a second number signal indicating the particular transfer to be carried out, a circulation circuit connecting the output end of the said short serial store back to its input end and comprising in a part of it two alternative paths, complementing means in one of the said alternative paths, a second gating means which is normally shut connected in the alternative path containing the complementing means and a third gating means which is normally open connected in the other alternative path, a first trigger connected to open the second gating means and to close the third gating means so that the signal in the said short serial store circulates unchanged or complemented according as the said first trigger is off or on respectively, means for putting the said first trigger on at a time just before the emergence from the short serial store of the first number signal, means for feeding the said first number signal to the said first trigger so that the first pulse representing a one in the said first number signal puts the trigger off, a fourth gate fed with a digit pulse occurring immediately after the end of the emergence of the said first member signal and connected to be opened by the output of the said first trigger when the said first trigger is on, a transfer timing trigger connected to be controlled by the output from the said fourth gate to yield an output for conditioning gates in the transfer path of the said engine to effect the required transfer in accordance with the said second number signal and an instruction timing trigger also connected to be controlled by the said output from the said fourth gate and connected to control in its turn the said first gating means so that the next instruction signal to be obeyed is gated into the said short serial store during the last minor cycle of the transfer.

3. Apparatus for timing the transfer of stored word signals from one part to another of an electrical digital computing engine constructed to work in the serial mode, the said apparatus comprising a short serial store for storing one word signal, a first gating means for gating an instruction word signal from the instruction store of the engine into the said short serial store, the said instruction word signal containing at least a first number signal indicating the time at which a transfer is to be carried out, a second number signal indicating the time at which the next instruction is to be received and a third number signal indicating the particular transfer to be carried out, a circulation circuit connecting the output end of the said short serial store back to its input end, a counting circuit connected in the said circulation circuit the said counting circuit being connected to register a count on each circulation of the instruction word and to emit a first output pulse when the number of counts so registered is equal to a number determined by the time at which the transfer is to be carried out, the time being indicated by the said first number signal, and to emit a second output pulse when the number of counts registered is equal to a number determined by the time at which the next instruction is to be received, the time being indicated by the said second number signal, a transfer timing trigger connected to be put on at the beginning of a minor cycle a predetermined time after the occurrence of the said first output pulse and to be put off at the beginning of a minor cycle a predetermined time after the occurrence of the said second ouput pulse and so to yield an output for conditioning gates in the transfer path of the said engine to effect the required transfer and an instruction timing trigger connected to be put on at the beginning of a minor cycle a predetermined time after the occurrence of the said second output pulse and to control the said first gating means so that the next instruction word signal to be obeyed is gated into the said short serial store during the last minor cycle of the transfer.

4. Apparatus according to claim 3 and comprising a first further trigger connected to be put on by the said first output pulse, a first further gate conditioned by the said first further trigger when on to pass a digit pulse at the end of a minor cycle, a second further gate conditioned by the said first further trigger when off to pass a digit pulse at the end of a minor cycle, the outputs from the said first and second further gates being connected to put the said transfer timing trigger on and off respectively, a second further trigger connected to be put on by the said second output pulse and connected to be put off in the minor cycle following the one in which it goes on and connected to put the said first further trigger off when it goes off.

5. Apparatus according to claim 4 and comprising a third further trigger connected to be put on by the said first output pulse, and to be put off when the said second further trigger goes off and also connected to put the said first further trigger on and off as this third further trigger goes on and off, a gate conditioned by the said third further trigger when on to pass the said second output pulse to the said second further trigger so that the said second output pulse cannot put the said second further trigger on until the said first output pulse has occurred.

6. Apparatus according to claim 5 and comprising a staticisor for staticising the said instruction word signal and a gate conditioned by a staticised digit signal from the said staticisor and by a pulse occurring every minor cycle to pass or not to pass the said pulse according to the value of the said digit signal to put the said first further trigger off in the minor cycle next following the one in which it goes on.

7. Apparatus according to claim 6 and comprising two more gates connected to pass a digit pulse at the end of a minor cycle when the said second further trigger is on and off respectively and thus to put the said instruction timing trigger on and off respectively.

8. Apparatus according to claim 7 and comprising a discriminating trigger connected to inhibit for one minor cycle when put on the output from the one of the said two more gates which puts the said instruction timing trigger off.

9. Apparatus according to claim 8 and comprising yet another trigger connected to inhibit when off an output from the said counting circuit and thus to stop the operation of the said engine by preventing the entry of the next instruction word signal to be obeyed into the said short serial store.

References Cited in the file of this patent

UNITED STATES PATENTS

| | | |
|---|---|---|
| 2,629,827 | Eckert et al. | Feb. 24, 1953 |
| 2,679,638 | Bensky | May 25, 1954 |

OTHER REFERENCES

Calculating Instruments and Machines, Douglas R. Hartree, The University of Illinois Press, 1949, pages 106 to 109.

Automatic Computing Engine of the National Physical Laboratory, Mr. Woodger, Nature, pages 270 to 271, February 17, 1951.